United States Patent
Pitzen

(10) Patent No.: US 7,138,177 B2
(45) Date of Patent: Nov. 21, 2006

(54) ADHESIVELY MOUNTED LEVER DEVICE

(75) Inventor: James F. Pitzen, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 329 days.

(21) Appl. No.: 10/719,558

(22) Filed: Nov. 21, 2003

(65) Prior Publication Data
US 2005/0112366 A1    May 26, 2005

(51) Int. Cl.
F16B 47/00    (2006.01)
F16B 2/18     (2006.01)
A47G 1/17     (2006.01)
C09J 7/02     (2006.01)

(52) U.S. Cl. ................ 428/343; 248/74 R; 248/248 R

(58) Field of Classification Search ............... 428/343; 248/74 R, 248 R
See application file for complete search history.

(56) References Cited

U.S. PATENT DOCUMENTS 3,241,795 A * 3/1966 Frye
4,024,312 A   5/1977 Korpman
4,352,476 A   10/1982 Meeks
4,759,091 A   7/1988 Kiss
4,877,277 A   10/1989 Leopoldi
5,516,581 A   5/1996 Kreckel et al.
6,101,689 A * 8/2000 Jo
6,106,937 A * 8/2000 Hamerski
6,231,962 B1  5/2001 Bries et al.
6,393,947 B1* 5/2002 Corcoran et al.

FOREIGN PATENT DOCUMENTS

DE    33 31 016 C2    7/1992
WO    WO 94/11295  *  5/1994

* cited by examiner

Primary Examiner—Daniel Zirker
(74) Attorney, Agent, or Firm—David B. Patchett

(57) ABSTRACT

A lever device includes an elongated body and a double-sided stretch releasing adhesive attached to the body, whereby the body can be firmly adhesively bonded to a surface and cleanly removed from the surface without damaging the surface by stretching the adhesive. The device may include a base, a body member pivotally connected with the base, and stretch releasing adhesive arranged to attach the base and/or body member to a surface or object. The base may be pivotally connected with an end of the body member or to the middle of the body member.

16 Claims, 2 Drawing Sheets

ADHESIVELY MOUNTED LEVER DEVICE

FIELD OF THE INVENTION

The present invention relates generally to levers, and more particularly to a lever device attached to a surface using stretch releasing adhesive, whereby the device can be firmly attached to the surface and used to apply a force to a surface or object but may be easily and cleanly removed from the surface without damaging the surface.

BACKGROUND OF THE INVENTION

Stretch releasing adhesive tapes are a class of high performance pressure-sensitive adhesives that combine strong holding power with clean removal and no surface damage. Stretch releasing adhesive tapes are characterized by their ability to be cleanly removed from a surface without damaging the surface by stretching the tape. A commercially available double-sided stretch releasing adhesive is the product sold under the trade designation COMMAND adhesive by 3M Company, St. Paul, Minn. This product is currently manufactured as discrete strips with one end of the strip including a non-adhesive pull tab to facilitate stretching of the strip during removal. Stretch releasing adhesives are useful in a wide variety of assembling, joining, attaching, and mounting applications.

Levers are simple machines capable of producing a mechanical advantage which find application in many well known devices. Common examples of levers include scissors, nut crackers, and tweezers. For certain lever devices, it is desirable to attach the lever to a surface. For example, U.S. Pat. No. 4,877,277 (Leopoldi) discloses a lever adapter for a door knob for aiding arthritic patients in rotating the door knob. The lever adapter is attached to the door knob by a concave, arcuate member having a layer of adhesive. U.S. Pat. No. 4,352,476 (Meeks) discloses a cable clamp including a lever. The cable clamp includes a double-sided adhesive tape for attaching the clamp to a work piece. These devices, however, have limited uses and suffer from other limitations and drawbacks.

There is therefore a need for a versatile lever device that can be easily attached to and removed from a surface or work piece and can be used to generate tensile or compressive forces or torque depending on the particular end use application. It would therefore be desirable to provide a simple and inexpensive lever device that can be used to produce tension, compression, or torque and that can be securely fastened to a surface and readily removed therefrom without damaging the surface or leaving unwanted residue.

SUMMARY OF THE INVENTION

The present invention overcomes the above-identified limitations in the field by providing a simple, inexpensive, and versatile lever device that can be applied to a surface to provide a mechanical advantage or disadvantage, and can be used to generate tensile or compressive forces or torque. The present invention also provides a device that can be affixed to a wide variety of surfaces including metal, glass, paper, wood, and masonry.

In one embodiment, the present invention provides a lever device comprising an elongated body and a double-sided stretch releasing adhesive attached to the body, whereby the body can be firmly adhesively bonded to a surface and cleanly removed from the surface without damaging the surface by stretching the adhesive.

In a specific embodiment, the present invention provides a lever device including a base, a body member pivotally connected with the base, and stretch releasing adhesive arranged to attach the base and/or body member to a surface or object. The base may be pivotally connected with an end of the body member or to the middle of the body member. The device may include a head pivotally connected with the body member. In another embodiment, the device may include biasing means, such as a spring, to urge the lever device toward or away from a surface or object.

In another specific embodiment, the device includes an elongated body member including a first portion having stretch releasing adhesive affixed transversely to the side thereof, and an end portion which serves as a handle, whereby the device can be attached to an item, such as the lid on ajar, and rotated to impart torque to the item.

For certain end use applications, it is necessary to attach the lever to a surface to generate the required force. For example, to use a first class lever to generate a tensile load on a surface or object, it is necessary to attach one end of the lever to the surface or object. In addition, it is often desirable to attach a lever to a surface or work piece to increase the versatility of a lever or to facilitate its use.

The present invention can be used for a wide variety of uses and applications such as holding an object in place while an adhesive, such as a hot melt adhesive, glue, or epoxy sets, dries, or otherwise cures. In addition, the device may be used to removably mount one or more items on a surface such as decorations, a banner, or a flag, whereby the item may be readily and repeatably removed and/or replaced by simply releasing the lever device to remove the item without removing the device itself from the surface. The present invention may also be used to generate torque which may be useful, for example, in replacing a light bulb or loosening and removing the lid on ajar. The present invention may also find use in woodworking, crafts, or other uses in the home, office, or in industrial applications. For example, the present invention may be used to remove a dent from a surface such as, for example, automotive vehicles including automobiles, boats, and RV's, or from aluminum siding, without damaging the surface and without leaving any adhesive residue on the surface. The devices according to the present invention are versatile and may be used to provide a compressive (i.e. clamping) force, a tensile (i.e. pulling) force, or torque (i.e. a rotational or twisting force).

BRIEF DESCRIPTION OF THE DRAWINGS

The present invention will be further described with reference to the accompanying drawings, in which.

DETAILED DESCRIPTION

Figure 1:
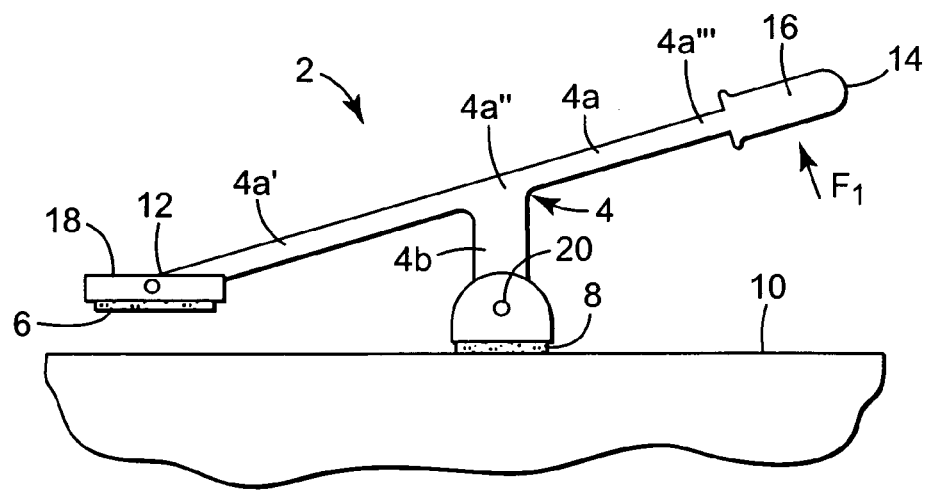
FIG. 1 is a side view of a device according to the invention.

Referring now to the drawings, FIG. 1 shows a lever device 2 in the form of a simple first class lever including an elongated, preferably rigid, body member 4 and a pair of double-sided stretch releasing adhesive strips 6,8 attached to the body member 4 for attaching the body member 4 to a surface 10. Throughout the description and the accompanying figures, functionally similar features are referred to with like reference numerals incremented by 100.

The double-sided adhesive strips 6,8 may be any conventionally known stretch releasing adhesive tape including a stretch releasing adhesive tape with an elastic backing, a stretch releasing adhesive tape with a highly extensible and substantially inelastic backing, or a stretch releasing adhesive tape comprising a solid elastic pressure sensitive adhesive.

Specific tapes suitable for use in the various embodiments of the present invention include the pressure sensitive adhesive tapes with elastic backings described in U.S. Pat. No. 4,024,312 (Korpman), the pressure sensitive adhesive tapes with highly extensible and substantially inelastic backings described in U.S. Pat. No. 5,516,581 (Kreckel et al.) and U.S. Pat. No. 6,231,962 (Bries et al.), and the solid elastic pressure sensitive adhesive described in German Patent No. 33 31 016.

A suitable double-sided commercially available stretch releasing adhesive tape is the product sold under the trade designation COMMAND adhesive by 3M Company, St. Paul, Minn. This product is currently manufactured as discrete strips with one end of the strip including a non-adhesive pull tab to facilitate stretching of the strip during removal.

In the illustrated embodiment, the body member 4 includes an elongated main portion 4a including first and second ends 12,14, and a support extension 4b extending downwardly from the body member 4 intermediate the first and second ends 12,14 toward the surface 10. The main portion 4a further comprises a first end portion 4a', a middle portion 4a" from which the support extension 4b extends, and a second end portion 4a'". The second end portion 4a'" is provided with a handle 16 which facilities manual actuation of the device 2. The body member 4 is sufficiently rigid to allow the body member to withstand or transmit the force required for a particular end use application.

An optional head 18 is connected with the first end 12 of the body member main portion 4a. The head 18 is provided with stretch releasing adhesive strip 6 to allow the head 18 to be affixed to the surface 10 or an object (not shown) arranged between the head 18 and the surface 10. To allow the head 18 and, consequently, the adhesive strip 6 to fully engage the surface 10 or an object, the head 18 is preferably pivotally attached to the first end portion 4a' of the body member 4. In this manner, as the head 18 initially contacts the surface 10, it will automatically pivot to align itself with the surface 10 in a manner that maximizes the contact surface area between the adhesive strip 6 and the associated surface 10 or object.

The terminal end of the support extension 4b is pivotally attached to a base 20 to allow the body member 4 to pivot relative to the surface 10. Stretch releasing adhesive strip 8 is provided on the bottom surface of the base 20 to temporarily affix the base 20 to the surface 10.

To use the device 2 to apply a compression force to surface 10, the base 20 is attached to the surface with adhesive strip 8. An upward force $F_1$ is then applied to the handle 16, thereby causing the head 18 to pivot downwardly toward surface 10. As the head 18 moves toward and engages the surface 10, a compressive force will be exerted on the surface 10. It will be recognized that when the device 2 is used in this manner (i.e. as a clamp or to generate a compressive force on a surface), adhesive strip 8 is needed to maintain the device 2 in engagement with surface 10, but that adhesive strip 6 is not needed because the head 18 is maintained in contact with surface 10 via compression. Stated another way, when the device 2 is used as a clamp, the head 18 is forced against the surface 10 which, in turn, forces the base 20 away from the surface 10, and adhesive strip 8 serves to hold the base 20 in contact with the surface 10 to allow the head 18 to exert a compressive force on the surface 10. To remove the device 2 from the surface 10, adhesive strip 8 is stretched in the known manner to simultaneously debond the adhesive strip from the device and surface.

Conversely, to use the device 2 to impart a pulling or stretching force on surface 10 or on an object (not shown) arranged between the surface 10 and head 18, the head 18 is attached to the surface 10 with stretch releasing adhesive strip 6, thereby adhesively bonding the head 18 to surface 10 or the object. When secured in this fashion, when the head 18 is pivoted such that the head 18 moves away from the surface 10 or the object, a tensile force will be exerted on the surface 10 or the object. When the device is used in this manner (i.e. as a pulling device to generate a tensile force relative to the surface), adhesive strip 6 is needed to attach the head 18 to the surface 10 or the object, but it will be recognized that adhesive strip 8 may be omitted because the device 2 is maintained in contact with the surface 10 via compression.

Figure 2:
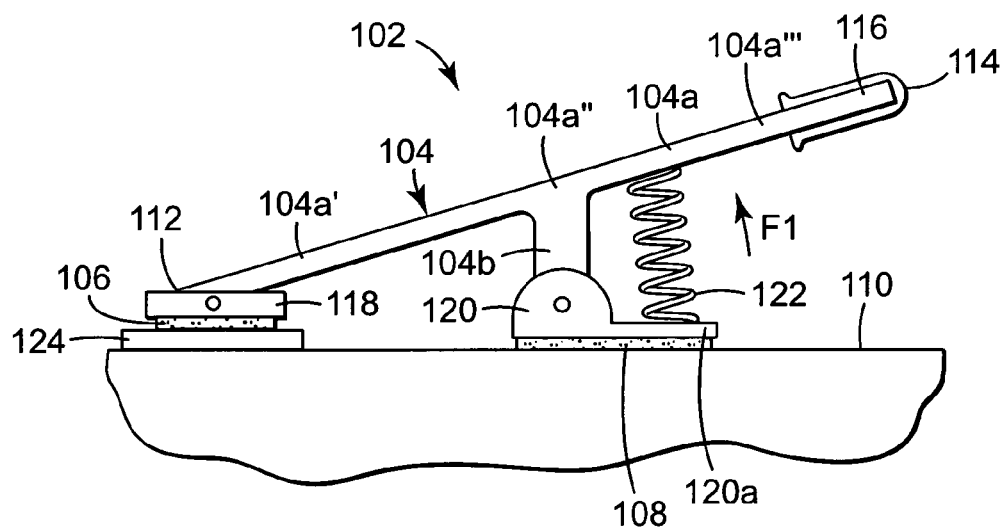
FIG. 2 is a side view of a second embodiment of the invention.

FIG. 2 shows a device 102 in accordance with an alternate embodiment of the invention. The device 102 is similar to the device 2 shown and described in FIG. 1 above except device 102 shown in FIG. 2 is provided with a spring 122 which generates the requisite forces, and thereby eliminates the need for a user to manually actuate the device to apply a force after the device is set.

The lever device 102 includes an elongated, preferably rigid, body member 104 and a pair of double-sided stretch releasing adhesive strips 106,108 attached to the body member 104 for attaching the body member 104 to a surface 110.

The body member 104 includes an elongated main portion 104a including first and second ends 112,114, and a support extension 104b extending downwardly from the body member 104 intermediate the first and second ends 112,114 toward the surface 110. The main portion 104a further comprises a first end portion 104a', a middle portion 104a" from which the support extension 104b extends, and a second end portion 104a'". The second end portion 104a'" is provided with a handle 116 which facilities manual actuation of the device 102 during initial installation.

As with the device 2 shown in FIG. 1, a head 118 is pivotally connected with the first end 112 of the body member main portion 104a. The head 118 is provided with stretch releasing adhesive strip 106 to allow the head 118 to be affixed to the surface 110 or an object 124 arranged between the head 118 and the surface 110. The terminal end of the support extension 104b is pivotally attached to a base 120 to allow the body member 104 to pivot relative to the surface 110. Stretch releasing adhesive strip 108 is provided on the bottom surface of the base 120 to temporarily affix the base 120 to the surface 110. The base 120 may include an abutment portion 120a extending outwardly from the bottom of the base 120 along the surface 110 which serves as a support, an attachment surface, and as an abutment for the spring 122.

Spring 122 is arranged between the base abutment portion 120a and the body member second end portion 104a'". Arranged in this manner, when handle 116 is urged toward surface 110, the spring 122 is compressed and generates a force $F_1$ that urges head 118 downwardly in the direction of the surface 110. When the device 102 is used in this manner (i.e. as a clamp to generate a compressive force), adhesive strip 108 is preferably provided to attach the device 102 to surface 110, but adhesive strip 106 is not needed because the head 118 is maintained in contact with the object 124 via compression. Because the spring 122 is arranged between the abutment portion 120a and the second end portion 104a of the body member, however, it will be recognized that adhesive strip 108 is not required regardless of whether the device is used to generate a tensile or compressive force. To separate the device 102 from the surface 110 and object 124, the adhesive strips 106,108 are stretched in the known manner to debond the adhesive strips from the associated device, surface, and object.

Alternatively, the spring 122 can be a tension spring that is attached to the base abutment portion 120a and the body member second end portion 104a''', such that when the handle 116 is urged upwardly away from base abutment portion 120a, the spring 122 is put in tension. When the spring 122 is in tension and the head 118 is adhesively bonded to object 124 via adhesive strip 106, a tensile force is exerted on the object 124.

Device 102 may be used as a clamp to apply a force to surface 110 or object 124 in the same manner as the device of FIG. 1 except the spring 122 generates the force associated with head 118. The device 102 may also be used to impart a pulling or stretching force on the surface 110 or object 124 by attaching stretch releasing adhesive strip 106 to head 118, thereby adhesively bonding the head 118 to the surface 110 or object 124. In this manner, when the head 118 is urged away from the surface 110 or object 124 by the force imparted by spring 122, a tensile force will be exerted on the surface 110 or object 124.

Figure 3:
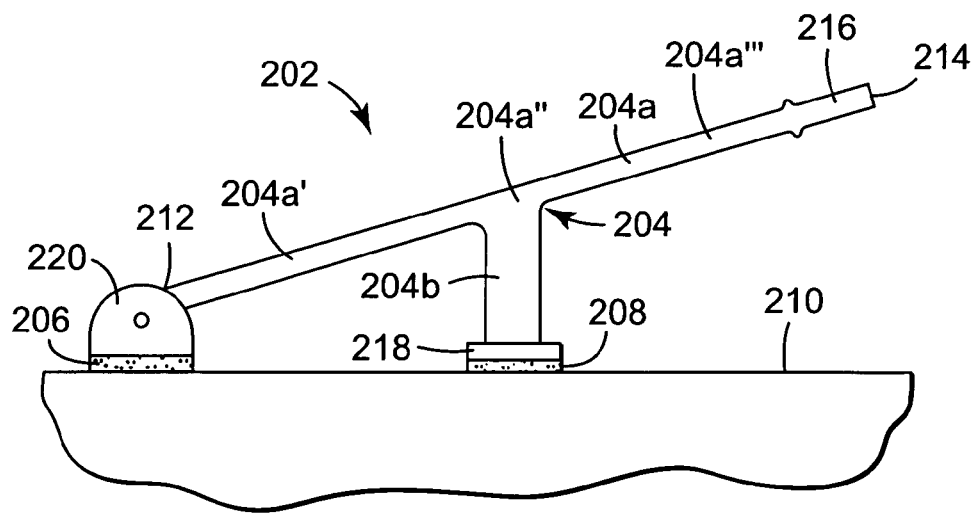
FIG. 3 is a side view of a third embodiment of the invention.

FIG. 3 shows a device 202 in accordance with another embodiment of the invention. The device 202 is similar to the device 2 shown and described in FIG. 1 above except the positions of the head 218 and the base 220 have been switched to form a second class lever.

The lever device 202 includes an elongated, preferably rigid, body member 204 and a double-sided stretch releasing adhesive strip 206 attached to the body member 204 for attaching the body member 204 to a surface 210.

The body member 204 includes an elongated main portion 204a including first and second ends 212,214, and a force applying extension portion 204b extending downwardly from the body member 204 intermediate the first and second ends 212,214 toward the surface 210. The main portion 204a further comprises a first end portion 204a', a middle portion 204a'' from which the force applying extension 204b extends, and a second end portion 204a'''. The second end portion 204a''' is provided with a handle 216 which facilitates manual actuation of the device 202.

The base 220 is pivotally connected with the first end 212 of the body member main portion 204a to allow the body member 204 to pivot relative to the surface 210. Stretch releasing adhesive strip 206 is provided on the bottom surface of the base 220 to temporarily affix the base 220 to the surface 210.

The device 202 is used to produce a compression force on the surface 210 by first adhesively bonding the base 220 to the surface via adhesive strip 206 and them simply moving the handle 216 downwardly in the direction of the surface 210 until the force applying extension 204b contacts the surface 210. When used to produce such a compressive force, adhesive strip 208 may be omitted. To produce a tensile force, the force applying extension 204b is first adhesively bonded to the surface 210 via stretch releasing adhesive strip 208, and the handle is moved upwardly away from the surface until a tensile force is produced. When used to produce such a tensile force, adhesive strip 206 may be omitted.

Figure 4:
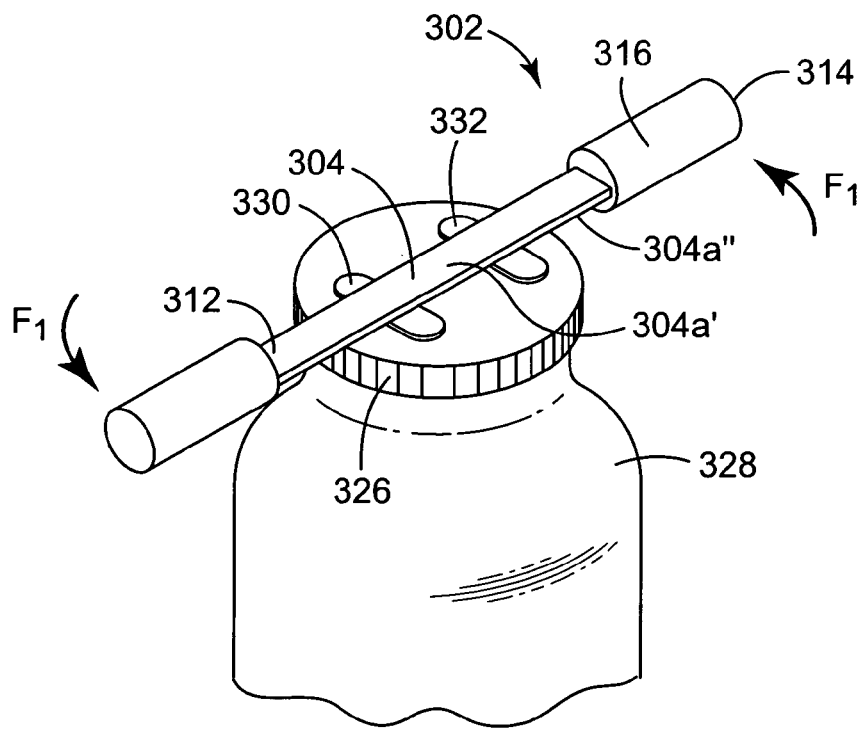
FIG. 4 is a side view of a forth embodiment of the invention.

FIG. 4 shows a device 302 in accordance with another embodiment of the invention that is particularly suited for producing torque. Device 302 is similar to the device 202 of FIG. 3 in that they both represent second class levers. The lever device 302 includes an elongated, preferably rigid, body member 304 and a pair of spaced double-sided stretch releasing adhesive strips 330, 332 attached to the body member 304 for adhesively bonding the body member 304 to an item 326, which in FIG. 4 is a lid secured to the top of a jar 328.

The body member 304 includes first and second ends 312,314, a first end portion 304a' to which the adhesive strips 330,332 are affixed, and a second end portion 304a'' comprising a handle 316 which facilitates manual actuation of the device 302. The body member 304 is sufficiently rigid to allow the body member to withstand or transmit the force required for a particular end use application. The body member 304 first end portion 304a' preferably includes a planar surface to which the adhesive strips 330,332 may be securely adhered. To allow the adhesive strips to more effectively withstand and transmit the forces generated during the rotation of the device (i.e. to minimize the possibility that the strips will tear or be removed by twisting), it is desirable to provide at least two adhesive strips, to space them along the longitudinal axis of the body member 304, and the arrange the strips 330,332 transversely (i.e. perpendicular) to the longitudinal axis of the body member 304 as shown. For certain end use applications, it may be desirable to provide the device 304 with a second handle (not shown) extending from the first end 312 of the body member 304 opposite the first handle 316.

To use the device 302 to generate torque, the body member 304 is first adhesively bonded to the item 326 via double-sided adhesive strips 330,332. A force perpendicular to the longitudinal axis of the body member 304 is then applied to the body member 304 to produce a moment, thereby imparting rotation to the item 326. To remove the device 302 from the item 326, adhesive strips 330,332 are stretched in the known manner to simultaneously debond the adhesive strips from the device and the item.

The lever device of any of the preceding embodiments, including the body member, the base, and the head, may be formed of a variety of materials depending on the particular intended end use application of the device. Suitable materials include metals such as steel, synthetic plastic materials such as polycarbonate and polyvinyl chloride, and wood. The particular material selected is not significant to the invention hereof, so long as it provides the desired combination of properties such as adequate strength, low cost, and ease of manufacture.

It will be apparent to those of ordinary skill in the art that various changes and modifications may be made without deviating from the inventive concept set forth above. For example, it will be recognized that the size and shape of the device may be modified to adapt the device for certain specific end use applications, that the number, size, shape, and arrangement of the stretch releasing adhesive strips may be varied, and that the device may be provided with an implement, such as an embossing stamp, depending on the specific end use application intended for the device. Thus, the scope of the present invention should not be limited to the structures described in this application, but only by the structures described by the language of the claims and the equivalents of those structures.

What is claimed is:

1. A lever device, comprising:
   (a) an elongated body member;
   (b) a base; and
   (c) a double-sided stretch releasing adhesive strip attached to said base;
   wherein said double-sided stretch releasing strip is configured to temporarily secure said base to a surface, and further wherein said lever device is configured such that when said base is secured to a surface by said strip, said elongated body member is pivotable about said base to selectively contact said surface.

2. A lever device as defined in claim 1, wherein said body member is rigid and includes a first end portion, a middle portion, and a second end portion, at least one of said first and second end portions comprising a handle.

3. A lever device as defined in claim 2, wherein said base is pivotally connected with said middle portion.

4. A lever device as defined in claim 3, further comprising a head pivotally connected with said first end portion.

5. A lever device as defined in claim 4, wherein a second stretch releasing adhesive strip is affixed to said head.

6. A lever device as defined in claim 5, further comprising biasing means arranged between said base and said body member second end portion for urging said second end portion.

7. A lever device as defined in claim 2, wherein said base is pivotally connected with said first end portion.

8. A lever device as defined in claim 2, wherein said body member includes a main portion and a support extension, said main portion including said first end portion, said middle portion, and said second end portion, and further where said support extension extends from said middle portion of said main portion.

9. A lever device as defined in claim 8, wherein said double-sided stretch releasing adhesive strip is a first double-sided stretch releasing adhesive strip, said lever device further comprising a second double-sided stretch releasing adhesive strip attached to said support extension opposite said main portion of said body member.

10. A lever device as defined in claim 8, wherein said support extension is pivotally connected with said base, and said body member pivots about a connection between said support extension and said base.

11. A method of producing torque with a lever device including rigid, elongated body member that includes a first end portion, a middle portion, and a second end portion, the method comprising the steps of:
    (a) attaching the body member to a surface using a double-sided stretch releasable adhesive strip, wherein the strip is affixed to the middle portion of the body member; and
    (b) applying a force to the body member parallel to the surface and perpendicular to the body member to produce torque.

12. A method as defined in claim 11, wherein applying a force to the body member includes applying a force to at least one of the first end portion and the second end portion.

13. A method as defined in claim 12, wherein at least one of the first end portion and the second end portion includes a handle.

14. A method as defined in claim 12, wherein the body member is linear.

15. A method as defined in claim 11, wherein the stretch releasing adhesive strip is a pair of elongated strips longitudinally spaced and arranged transversely with respect to the longitudinal axis of the body member.

16. A method as defined in claim 15, wherein the middle portion includes a planar surface for receiving the adhesive strips to facilitate attaching the body member to the surface.

* * * * *